United States Patent
Ramachandra et al.

(10) Patent No.: US 10,141,998 B2
(45) Date of Patent: Nov. 27, 2018

(54) UTILIZATION OF ANTENNA BEAM INFORMATION

(71) Applicant: Telefonaktiebolaget LM Ericsson (publ), Stockholm (SE)

(72) Inventors: Pradeepa Ramachandra, Linköping (SE); Harald Kallin, Sollentuna (SE); Panagiota Lioliou, Sundbyberg (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/543,357

(22) PCT Filed: Feb. 2, 2015

(86) PCT No.: PCT/EP2015/052099
§ 371 (c)(1),
(2) Date: Jul. 13, 2017

(87) PCT Pub. No.: WO2016/124218
PCT Pub. Date: Aug. 11, 2016

(65) Prior Publication Data
US 2018/0013476 A1   Jan. 11, 2018

(51) Int. Cl.
*H04B 7/14* (2006.01)
*H04B 7/06* (2006.01)
*H04W 28/08* (2009.01)

(52) U.S. Cl.
CPC ........... *H04B 7/0617* (2013.01); *H04B 7/063* (2013.01); *H04B 7/0621* (2013.01); *H04W 28/08* (2013.01)

(58) Field of Classification Search
CPC ...... H04B 7/0617; H04B 7/043; H04B 7/084; H04W 28/08
USPC .... 455/25, 63.4, 562.2, 575.7; 342/359, 368
See application file for complete search history.

(56) References Cited

U.S. PATENT DOCUMENTS

| | | | |
|---|---|---|---|
| 5,621,752 A | 4/1997 | Antonio et al. | |
| 6,782,277 B1 * | 8/2004 | Chen | H01Q 1/246 342/359 |
| 7,657,288 B2 | 2/2010 | Chitrapu et al. | |
| 7,729,662 B2 | 6/2010 | Abramov et al. | |
| 8,787,841 B2 | 7/2014 | Ketchum et al. | |
| 9,173,131 B2 * | 10/2015 | Liu | H04W 36/22 |
| 2002/0034967 A1 | 3/2002 | Taniguchi et al. | |

(Continued)

FOREIGN PATENT DOCUMENTS

| | | | |
|---|---|---|---|
| EP | 0926916 A2 | 6/1999 | |
| EP | 1505742 A2 | 2/2005 | |

(Continued)

*Primary Examiner* — Sonny Trinh
(74) *Attorney, Agent, or Firm* — Coats & Bennett, PLLC (57) ABSTRACT

There is provided a method for utilizing antenna beam information. The method is performed by a network node. The method comprises acquiring antenna beam information indicative of a direction of a wireless device (WD) specific beam of the network node. The method comprises classifying the acquired antenna beam information into a cell specific beam category based on an angular difference between the direction and a direction of main lobe of a cell specific beam of the network node. The method comprises performing at least one of a load balancing action of the wireless device and a radiation beam pattern change related to the cell specific beam category.

22 Claims, 6 Drawing Sheets

(56) References Cited

U.S. PATENT DOCUMENTS

| | | | |
|---|---|---|---|
| 2006/0202892 A1* | 9/2006 | Feng | H01Q 3/24 |
| | | | 342/374 |
| 2012/0196591 A1* | 8/2012 | O'Keeffe | H01Q 1/246 |
| | | | 455/427 |
| 2012/0319900 A1* | 12/2012 | Johansson | H01Q 1/246 |
| | | | 342/368 |
| 2013/0331081 A1* | 12/2013 | Rune | H04B 7/0408 |
| | | | 455/418 |
| 2014/0022124 A1* | 1/2014 | Zimmermann | H01Q 1/246 |
| | | | 342/368 |
| 2017/0098884 A1* | 4/2017 | Barnickel | H01Q 1/24 |

FOREIGN PATENT DOCUMENTS

| | | |
|---|---|---|
| EP | 1592148 A1 | 11/2005 |
| EP | 1216524 B1 | 7/2008 |
| EP | 2742607 | 6/2014 |
| EP | 2775634 A2 | 9/2014 |
| JP | 2006211404 A | 8/2006 |
| RU | 2254682 C1 | 6/2005 |
| RU | 2419213 C2 | 5/2011 |
| WO | 9805180 A1 | 2/1998 |
| WO | 2013022161 A1 | 2/2013 |
| WO | 2013184719 A1 | 12/2013 |

\* cited by examiner

UTILIZATION OF ANTENNA BEAM INFORMATION

TECHNICAL FIELD

Embodiments presented herein relate to antenna beam information, and particularly to a method, a network node, a computer program, and a computer program product for utilizing antenna beam information.

BACKGROUND

In communications networks, there may be a challenge to obtain good performance and capacity for a given communications protocol, its parameters and the physical environment in which the communications network is deployed.

Today, advanced antenna setups and techniques enable an ever increasing throughput and robustness in wireless communications networks. One such technique is to shape the beams (i.e., to perform beamforming) of the antenna array. Beamforming is today made possible with the use of so-called reconfigurable antenna systems (RAS).

A cell specific beam refers to the antenna beam pattern generated to provide the cell specific reference symbols (CRS) coverage for a cell in the communications network. This beam pattern will be similar to all the wireless devices served in the cell. In general terms, the coverage area of the cell can be largely adjusted by changing the parameters related to cell specific beamforming. In general terms, the cell shape is determined by the coverage of the CRS. CRS are transmitted in particular time-frequency slots. In general terms, the shape of the beam (i.e., the beam shape) is controlled by combining antenna elements in a phased antenna array.

Cell specific beams are considered when deciding the coverage area of the cell and also when defining the distribution of the received signal strength in the coverage area of the cell. The cell specific beams can be controlled by changing the antenna parameters such as antenna downtilt, azimuth orientation, elevation and horizontal beam widths.

Device specific beamforming is a way to improve the path gain towards the served wireless devices by providing directive antenna gain towards the wireless devices. In general terms, device specific beams are more narrow in beam width than the cell specific beam so as to maximize the antenna gain towards the wireless device. A network node of a single cell can serve multiple of its served wireless devices with multiple such device specific beams. That is, within the coverage area of a single cell specific beam, there can be one or more device specific beams active at the same time.

In general terms, a self-organizing Network (SON) is an automation technology designed to make the planning, configuration, management, optimization and healing of communications network simpler and faster. The SON functions in the network may thus be configured to automatically change network related parameters to improve the performance of the communications network. Such SON functions may include antenna parameter optimization, load balancing, etc. In case of antenna parameter optimization, the antenna parameters may be changed either to reduce the interference to neighbor cells and/or to improve the signal strength to wireless devices in the same cell and/or to perform load balancing between cells. This is generally referred to as a cell shaping SON functionality.

There are many ways to carry out load balancing, such as cell shaping or mobility load balancing, by introducing cell range expansion etc. Each of these load balancing mechanisms are beneficial in different scenarios.

When cell shaping needs to be carried out in a cell, existing mechanisms as disclosed above are based on either jointly optimize performance at the borders of a cell with one or more neighbor cells, or individually optimizing the performance in the cell alone. While performing the changes in the cell for which performance is to be optimized, or while trying to understand with which neighbor cell(s) the cell for which performance is to be optimized needs to be jointly optimized, existing mechanisms may rely on different additional measurements, which cause measurement overhead. Alternatively, existing mechanisms perform the antenna parameter changes and then analyzes the impact of these changes on the system performance (such as the overall performance of the communications network, or part thereof) in order to determine whether the performed changes were beneficial or not. The first approach introduces additional signaling overhead. The second approach is prone to selection of poor antenna parameters and/or poor identification of neighbor cell(s) for joint optimization, thereby causing performance dips (possibly in coverage and/or capacity of the cell).

Hence, there is still a need for an improved cell shaping for load balancing and/or radiation beam pattern change.

SUMMARY

An object of embodiments herein is to provide efficient cell shaping for load balancing and/or radiation beam pattern change.

According to a first aspect there is presented a method for utilizing antenna beam information. The method is performed by a network node. The method comprises acquiring antenna beam information indicative of a direction of a wireless device (WD) specific beam of the network node. The method comprises classifying the acquired antenna beam information into a cell specific beam category based on an angular difference between the direction of the WD specific beam and a direction of main lobe of a cell specific beam of the network node. The method comprises performing at least one of a load balancing action of the wireless device and a radiation beam pattern change related to the cell specific beam category.

Advantageously this provides efficient cell shaping for load balancing and/or beam change.

Advantageously, this improves the network performance by enabling joint antenna parameter optimization with a neighbor cell.

Advantageously, this improves the network performance by enabling efficient load balancing between two cells.

Advantageously, this improves the network performance by enabling efficient antenna parameter changes.

According to a second aspect there is presented a network node for utilizing antenna beam information. The network node comprises a processing unit. The processing unit is configured to cause the network node to acquire antenna beam information indicative of a direction of a wireless device (WD) specific beam of the network node. The processing unit is configured to cause the network node to classify the acquired antenna beam information into a cell specific beam category based on an angular difference between the direction of the WD specific beam and a direction of main lobe of a cell specific beam of the network node. The processing unit is configured to cause the network node to perform at least one of a load balancing action of the wireless device and a radiation beam pattern change related to the cell specific beam category.

According to a third aspect there is presented a computer program for utilizing antenna beam information, the computer program comprising computer program code which, when run on a processing unit of a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
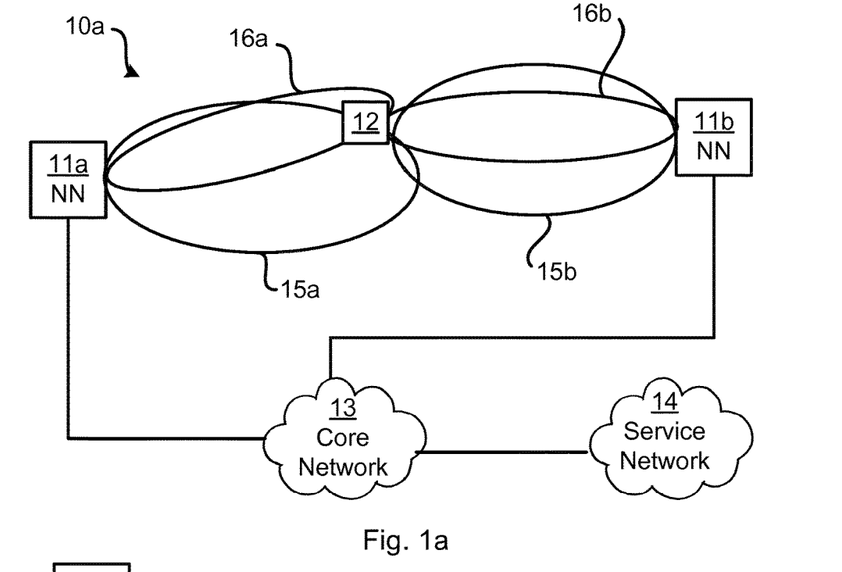
FIGS. 1a, 1b, and 1c are schematic diagram illustrating communication networks according to embodiments.

FIG. 1a is a schematic diagram illustrating a communications network 10a where embodiments presented herein can be applied. The communications network 10a comprises network nodes 11a, 11b. Each network node 11a, 11b provides network coverage for wireless devices, one of which is illustrated at reference numeral 12. The network coverage is defined by regions in which the network node 11a, 11b is enabled to transmit signals to, and receive signals from, the wireless devices 12. Particularly, In FIG. 1a radiation beam patterns of cell specific beams as transmitted by the network nodes 11a, 11b are schematically indicated by reference numerals 15a, 15b, and radiation beam patterns of wireless device (WD) specific beam of the network nodes 11a, 11b are schematically indicated by reference numerals 16a, 16b. Signals as transmitted in the transmission beams 16a, 16b may by the wireless device 12 be used for performing measurements, such as CSI-RSRP measurements. The radiation beam patterns 15a, 15b may be used for transmitting signals, such as CRS, to the wireless device 12.

The network nodes 11a, 11b are operatively connected to a core network 13 which, in turn, is operatively connected to a service network 14. A wireless device 12 operatively connected to one of the network nodes 11a, 11b is thereby able to access content and services as provided by the service network 14.

The network nodes 11a, 11b may be provided as any combination of radio access network nodes such as radio base stations, base transceiver stations, node Bs (NBs), and evolved node Bs (eNBs). As the skilled person understands, the communications network 10a may comprise a plurality of network nodes 11a, 11b; the herein disclosed embodiments are not limited to a particular number of network nodes 11a, 11b. The wireless device 12 may be provided as a portable wireless device such as a mobile station, a mobile phone, a handset, a wireless local loop phone, a user equipment (UE), a smartphone, a laptop computer, a tablet computer, or a wireless sensor device. As the skilled person understands, a plurality of wireless devices 12 could be operatively connected to the network nodes 11a, 11b; the herein disclosed embodiments are not limited to a particular number of wireless devices.

The embodiments disclosed herein relate to utilizing antenna beam information, such as WD specific beam information. In order to utilize antenna beam information there is provided a network node 11a, 11b, a method performed by the network node 11a, 11b, a computer program comprising code, for example in the form of a computer program product, that when run on a processing unit of the network node 11a, 11b, causes the network node 11a, 11b to perform the method.

Figure 2A:
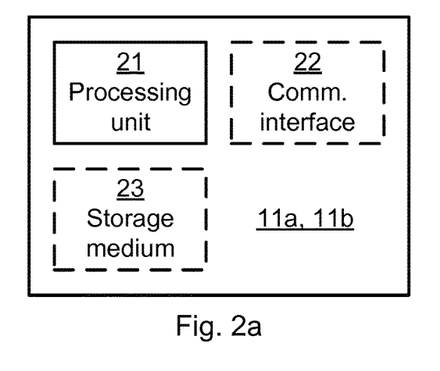
FIG. 2a is a schematic diagram showing functional units of a network node according to an embodiment.

FIG. 2a schematically illustrates, in terms of a number of functional units, the components of a network node 11a, 11b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The network node 11a, 11b may further comprise a communications interface 22 for communications with at least one wireless device 12, the core network 13 and another network node 11a, 11b. As such the communications interface 22 may comprise one or more transmitters and receivers, comprising analogue and digital components and a suitable number of antennas for wireless communications and ports for wireline communications. The processing unit 21 controls the general operation of the network node 11a, 11b e.g. by sending data and control signals to the communications interface 22 and the storage medium 23, by receiving data and reports from the communications interface 22, and by retrieving data and instructions from the storage medium 23. Other components, as well as the related functionality, of the network node 11a, 11b are omitted in order not to obscure the concepts presented herein.

Figure 2B:
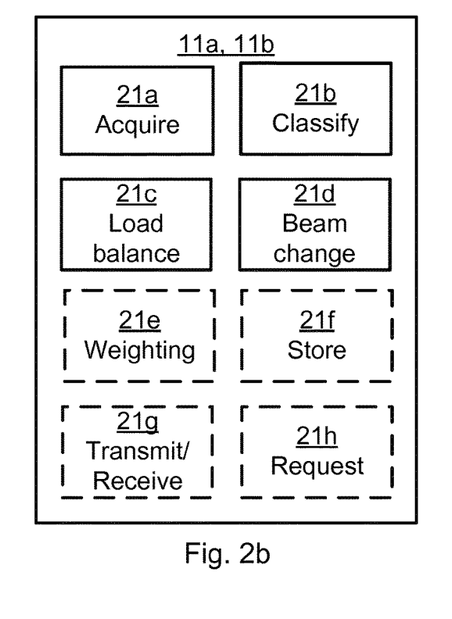
FIG. 2b is a schematic diagram showing functional modules of a network node according to an embodiment.

FIG. 2b schematically illustrates, in terms of a number of functional modules, the components of a network node 11a, 11b according to an embodiment. The network node 11a, 11b of FIG. 2b comprises a number of functional modules; an acquire module 21a configured to perform below steps S102, S106, S108, a classify module 21b configured to perform below step S114, S116, S118, a load balance module 21c configured to perform below step S126, and a beam change module 21d configured to perform below step S126. The network node 11a, 11b of FIG. 2b may further comprises a number of optional functional modules, such as any of a weighting module 21e configured to perform below steps S110, S112, a store module 21f configured to perform below step S120, a transmit and/or receive module 21g configured to perform below step S122, and a request module 21h configured to perform below step S124. The functionality of each functional module 21a-h will be further disclosed below in the context of which the functional modules 21a-h may be used. In general terms, each functional module 21a-h may be implemented in hardware or in software. Preferably, one or more or all functional modules 21a-h may be implemented by the processing unit 21, possibly in cooperation with functional units 22 and/or 23. The processing unit 21 may thus be arranged to from the storage medium 23 fetch instructions as provided by a functional module 21a-h and to execute these instructions, thereby performing any steps as will be disclosed hereinafter.

Figure 3:
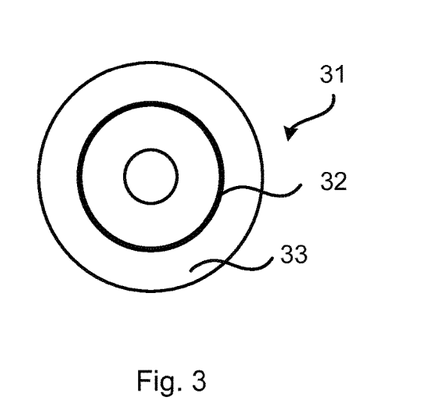
FIG. 3 shows one example of a computer program product comprising computer readable means according to an embodiment.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 4:
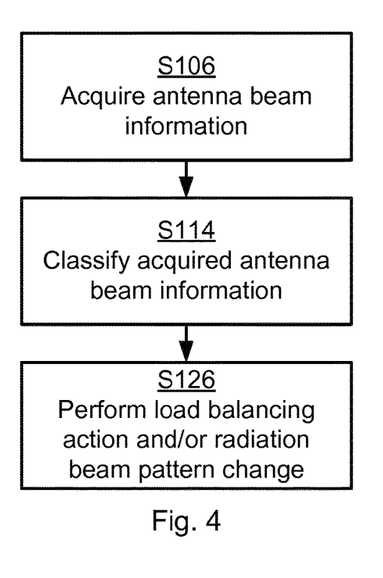
FIGS. 4, 5, and 6 are flowcharts of methods according to embodiments.
Figure 5:
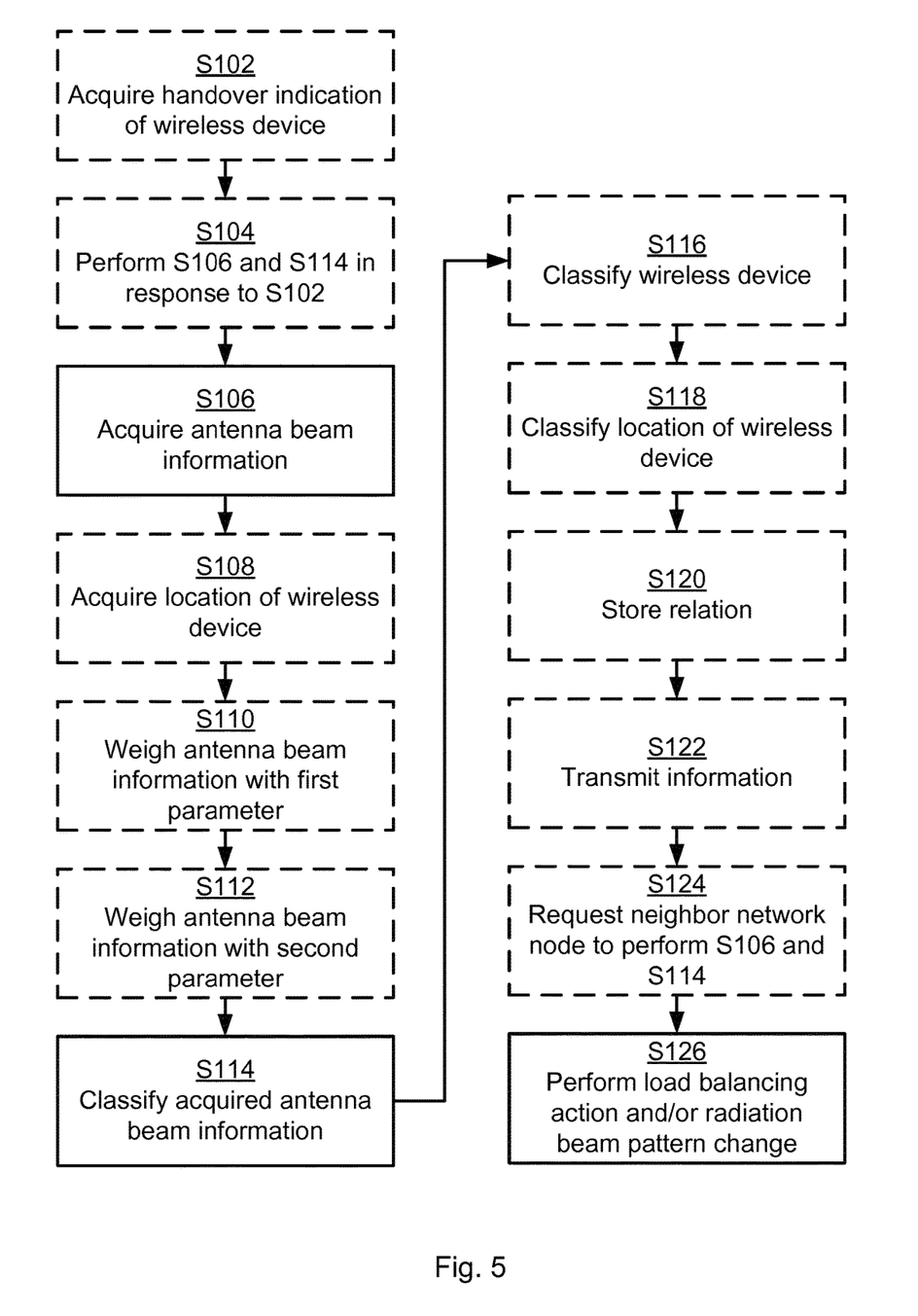
Figure 6:
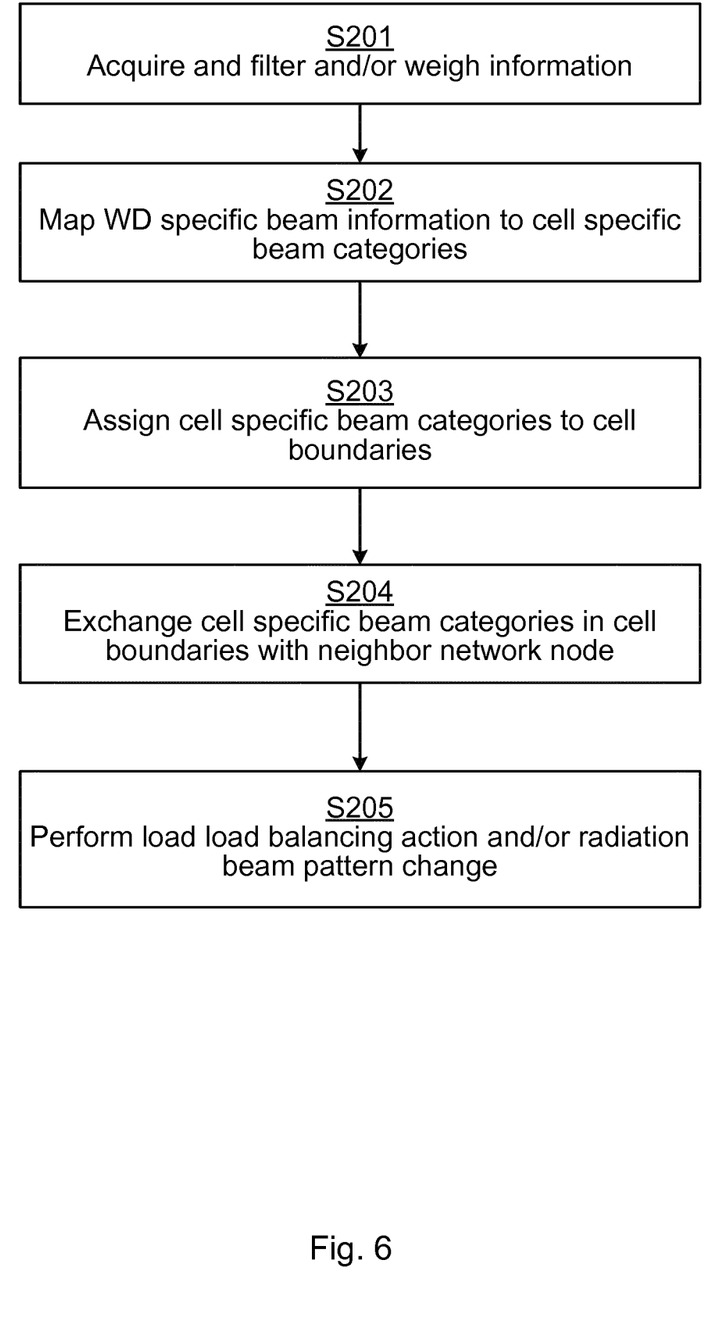

FIGS. 4, 5, and 6 are flow chart illustrating embodiments of methods for utilizing antenna beam information. The methods are performed by the network node 11a. The methods are advantageously provided as computer programs 32.

Reference is now made to FIG. 4 illustrating a method for utilizing antenna beam information as performed by a network node 11a according to an embodiment.

In order for the network node 11a to be able to utilize antenna beam information such antenna beam information needs to be acquired by the network node 11a. Hence, the network node 11a is configured to, in a step S106, acquire antenna beam information. The antenna beam information is indicative of a direction of a wireless device (WD) specific beam 16a of the network node 11a.

The network node 11a performs a classification based on the antenna beam information. Hence, the network node 11a is configured to, in a step S114, classify the acquired antenna beam information into a cell specific beam category. The classification is based on a relation between an angle of the direction of the WD specific beam 16a and a direction of main lobe of a cell specific beam 15a of the network node. Particularly, the classification is based on an angular difference $\theta$, $\varphi$ between the direction of the WD specific beam 16a and a direction of main lobe of a cell specific beam 15a of the network node 11a.

The network node 11a performs an action based on in which category the acquired antenna beam information has been classified. Particularly, the network node 11a is configured to, in a step S126, perform a load balancing action of the wireless device 12 and/or a radiation beam pattern change related to the cell specific beam category. As will be further disclosed below, there are different types of such action that the network node 11a may perform.

In other words, when WD specific beam forming is used in a cell, the network node 11a is enabled to utilize statistics from the WD specific beam characteristics for forming cell specific beam shaping. The collected statistics could be used for changing the antenna parameters of cell shaping, proper SON function selection for carrying out load balancing, and/or selecting the optimal one or more neighbor cells for joint antenna parameter tuning. Details relating to this will be presented below.

This provides efficient cell shaping for load balancing and/or beam change. This for example, enables the correct direction of an antenna parameter change in the cell under consideration to be determined. This for example, enables selection of which neighbor cells to consider such that boundary regions (i.e., cell edges) of the cells are impacted in the intended manner. This for example, ensures that the correct direction of antenna parameter change is carried out.

Embodiments relating to further details of utilizing antenna beam information by a network node 11a will now be disclosed.

Reference is now made to FIG. 5 illustrating methods for utilizing antenna beam information as performed by a network node 11a according to further embodiments.

There may be different ways to acquire the antenna beam information. Different embodiments relating thereto will now be described in turn.

Figure 1B:
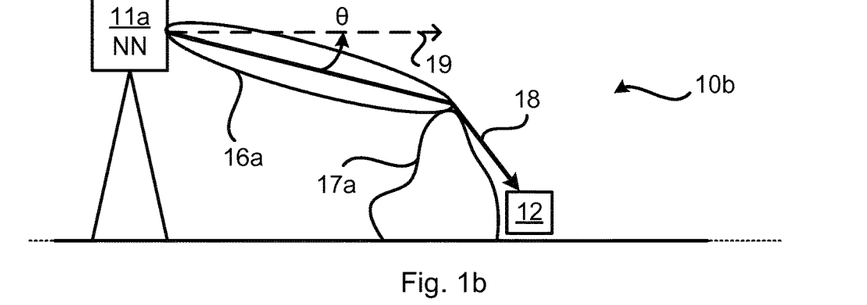
Figure 1C:
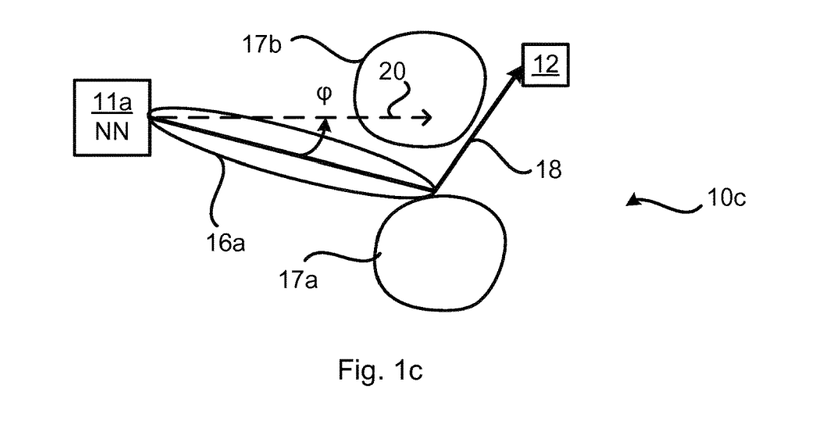

In general terms, WD specific beamforming capable wireless devices 12 may be served with beams that try to provide high antenna directivity gain towards the intended wireless device 12. The WD specific beam may thus be used by a wireless device 12 capable of WD specific beam forming. The direction of the WD specific beam may be the direction of the main lobe of the WD specific beam. Additionally or alternatively, the direction of the WD specific beam may be a time-wise mean direction of the direction of the main lobe of the WD specific beam. In general terms, the WD specific beams generated in this way are highly directional and therefore give a good indication of which directions of the antenna beam are more beneficial for the wireless device(s) 12. The acquired optimal direction in step S106 may or may not be along the direction following the shortest geometrical distance between the network node 11a and the wireless device 12, but the optimal diffracted and/or reflected paths as shown in FIG. 1b and FIG. 1c, respectively. FIG. 1b schematically illustrates a scenario where the optimal direction (θ degrees in elevation from an axis 19 parallel with the horizon) of the beam 16a towards the wireless device 12 has been diffracted by a physical obstacle 17a into a direction 18. FIG. 1b schematically illustrates a scenario where the optimal direction (φ degrees in azimuth from an axis 20 in the line of sight direction of the antenna of the network node 11a) of the beam 16a towards the wireless device 12 has been reflected by a physical obstacle 17a into a direction 18, due to a physical obstacle 17b blocking the direct path from the network node 11a to the wireless device 12.

In step S106, information may be acquired regarding parts, or all, of the wireless devices 12 that are being served with WD specific beams. The information includes the direction of the UE specific main beam used. This could either be given as vertical beam tilt (θ tilt), vertical beam width (θ beam width), azimuth orientation (φ azimuth) and horizontal beam width (φ beam width), or one or more values calculated as a function of these. That is, according to an embodiment, the antenna beam information further is indicative of at least one of azimuth direction and shape and an elevation direction and shape of the WD specific beam.

The acquired information could be weighed or filtered based on the confidence with which the network node 11a is able to generate the WD specific beams. For example, when the wireless device 12 is less mobile in a favorable environment, the network node 11a can create a narrow beam that the wireless device 12 can take advantage of. When the wireless device 12 is moving at high speeds, then creating a pointed WD specific beam is more difficult and therefore, such moving wireless devices 12 could possibly be excluded from the acquired information. Hence, in a case the wireless device 12 is associated with a speed of movement, the network node 11a is, according to an embodiment, configured to, in a step S112, weigh the antenna beam information with a second importance weight parameter, wherein the second importance weight parameter is inversely proportional to the speed. The classifying in step S114 may then be based on this weighted antenna beam information.

Further, the network node 11 may be configured to utilize beam width values to filter or weigh information acquired from the wireless devices 12. For example a narrower beam width may be considered to yield a higher confidence in the measurement from the wireless device 12 than a wider beam width, and thus information associated with a narrower beam width could have a lower weight, or be kept in the considered data after filtering filtered out, while a larger beam width thus could be considered to yield a lower confidence in the measurement and could have a higher weight or be filtered out. Hence, in a case the WD specific beam has a width, the network node 11a is, according to an embodiment, configured to, in a step S110, weigh the antenna beam information with a first importance weight parameter, wherein the first importance weight parameter is inversely proportional to the width. The classifying in step S114 may then be based on this weighted antenna beam information.

There may be different ways to perform the classification based on the antenna beam information. Different embodiments relating thereto will now be described in turn.

In general terms, as disclosed above, once the antenna parameters from the WD specific beam have been acquired for a wireless device 12, it is classified into a cell specific beam category. This may involve mapping the antenna parameters onto a cell specific beam diagram. One purpose of classifying the acquired antenna beam information into a cell specific beam category is to understand where the wireless device 12 maps from the cell shaping beam's point of view. Two example beam shapes 71, 72 of the cell shaping beam is given in FIG. 7. The disclosure from here on is in terms of vertical beam pattern of the antenna (hence tilt tuning) but the same disclosure applies also for horizontal beam pattern (therefore azimuth tuning).

Figure 8:
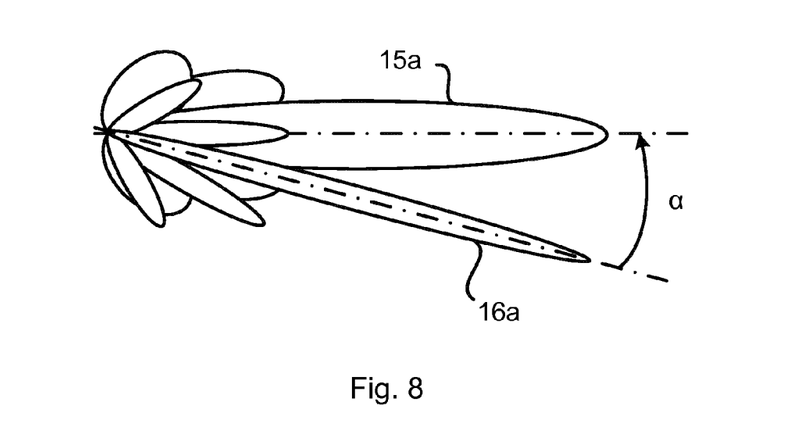
FIG. 8 schematically illustrates a WD specific beam and a cell specific beam according to an embodiment.

The antenna beam information acquired in step S106 may be mapped onto the current cell shaping beam's antenna diagram. Based on the location of the UE specific beam parameters in the cell specific beam's antenna diagram, a classification of the wireless device 12 is made as in step S114. In FIG. 8, an example mapping of WD specific beam 16a for a wireless device 12 along with the cell specific beam 15a is shown, where the main lobe of the WD specific beam 16a and the cell specific beam 15a is separated by an angle α. By observing the antenna diagram of the cell specific beam, the most beneficial ray towards the wireless device 12 is along a side lobe of the cell specific beam 15a.

Based on such a mapping to a cell specific beam's antenna diagram region, the wireless devices 12 may thus be classified into cell specific beam categories. An example of such a classification procedure is provided below.

The cell specific beam category may be selected from a set of at least two cell specific beam categories. In general terms, the a cell specific beam category may be selected from a set of possible cell specific beam categories, such as main lobe, not in main lobe, side lobe, low confidence, right of main lobe, left of main lobe, a specific angle difference, etc.

Figure 7:
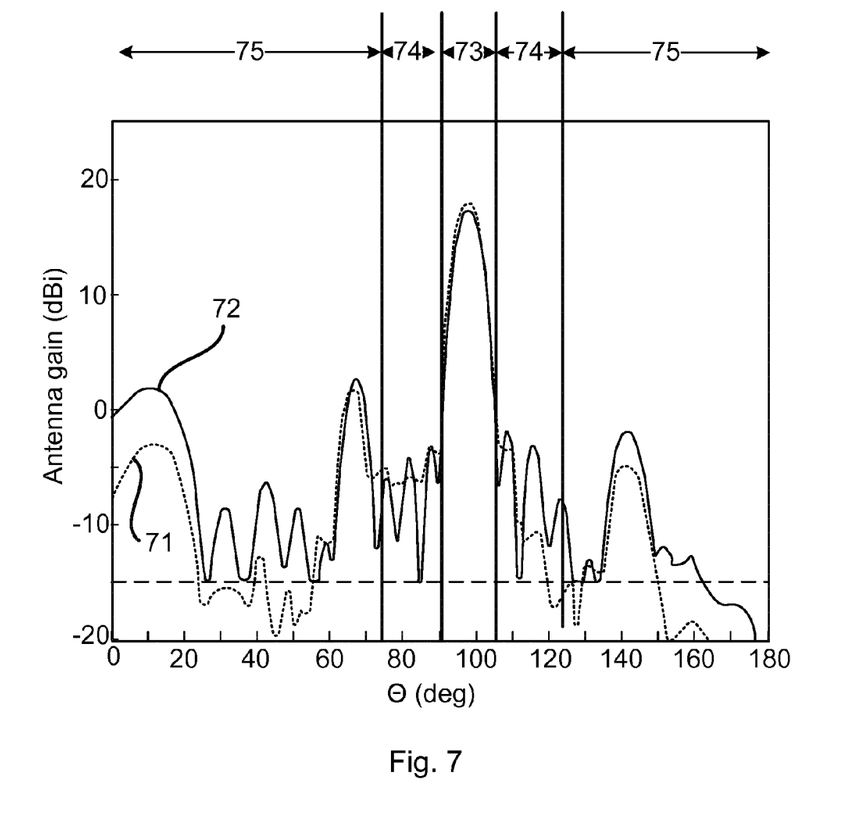
FIG. 7 schematically illustrates beam shapes according to an embodiment.

According to one example, the antenna diagram is divided in to three different categories, namely main lobe region 73, side lobe region 75, and low confidence region 74, see FIG. 7. As can be seen from the illustrative example of FIG. 7, The main lobe region 73 is the region of the antenna diagram covered by the main lobe of the cell shaping beam and the side lobe regions 75 are the regions covered by the side lobes of the cell shaping beam. The region named low confidence 74 is used when there is no clear overlapping of the WD specific beam with either the main lobe or the side lobes of the cell specific beam pattern.

The wireless device 12 may thus, by means of the acquired antenna beam information, be categorized under these antenna diagram regions based on the WD specific beam characteristics. According to an embodiment the network node 11a is configured to, in a step S116, classify the wireless device 12 into a cell specific beam category based on the angular difference (i.e., the angular difference θ, φ between the direction of the WD specific beam 16a and a direction of main lobe of the cell specific beam 15a of the network node 11a).

The classification may by the network node 11a be used when determining how many wireless devices 12 and/or how large part of the wireless devices 12 and/or traffic in the cell that are placed in a certain region of the antenna diagram, for example in the cell shaping beam main lobe or side lobes. This information can then be used inter alia to optimize the antenna parameters, as in step S126. As will be disclosed next, the classification can also be used for the network node 11a to determine network performance at cell boundaries and the relation between neighbor cells.

There may be further different ways to utilize the classification performed in step S106. Different embodiments relating thereto will now be described in turn.

For example, the classification may be the network node 11a be used to determine how the coverage area of a cell overlap in the boundary region towards other cells in terms of the cell shaping beam's antenna diagram point of view.

Particularly, the network node 11a, is, according to an embodiment, configured to, in a step S108, acquire a location of the wireless device 12, and in a step S118, classify the location of the wireless device 12 into a cell specific beam category based on the angular difference (i.e., the angular difference mentioned in step S114). The classifying in step S118 is in one embodiment only performed if the location of the wireless device corresponds to a boundary of a region covered by the cell specific beam 15a.

This determination may, for example, be performed by the network node 11a considering the classification of the cell shaping beam's region (i.e., the cell specific beam category) from step S114 for a wireless device 12 when the wireless device 12 is about to be handed over by the network node 11a to a network node 11b of specific neighbor cell. Particularly, the network node 11a, is, according to an embodiment, configured to, in a step S102, acquire an indication that the wireless device 12 is to be handed over to a neighbor network node 11b, and in response thereto, in a step S104, perform the acquiring of antenna beam information as in step S106 and the classifying of the acquired antenna beam information as in step S114.

Figure 9:
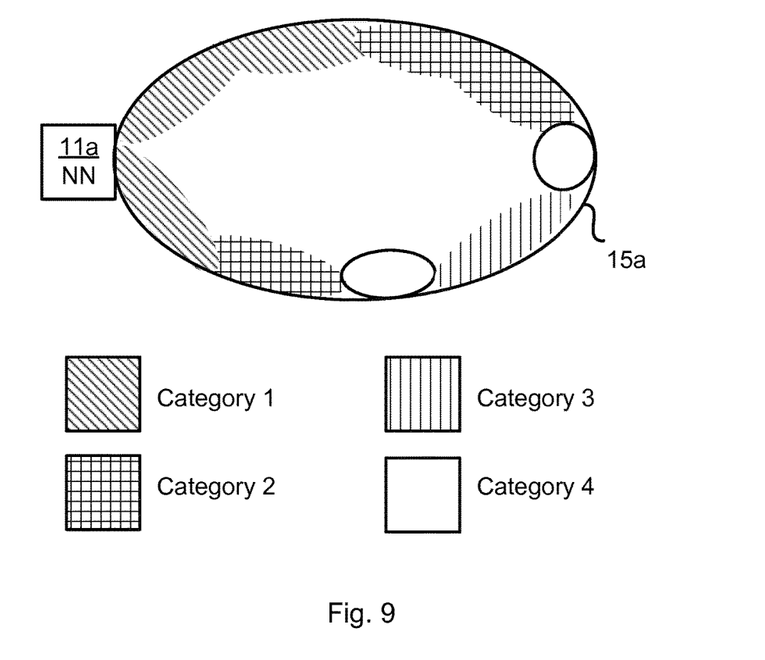
FIG. 9 schematically illustrates cell edge regions of a cell specific beam according to an embodiment.

By using such location information, the network node 11a may thus build a map of its boundary regions coverage of the cell specific beam 15a in terms of cell shaping antenna pattern. Such an example, based on four general categories (category 1, category 2, category 3, and category 4), for example selected from the categories mentioned above, is schematically illustrated in FIG. 9.

The network node 11a could, based on the acquired information, update a memory keeping track of which type of antenna lobe pointing in the direction of a certain neighbor cell. That is, the network node 11a, is, according to an embodiment, configured to, in a step S120, store a relation between the location of the wireless device 11 and the cell specific beam category of the location.

One example, based on the categories from the above disclosed example, of how this information could be stored is shown in Table 1.

TABLE 1

Example table keeping track of which type of antenna lobe pointing in the direction of a certain neighbor cell.
Cell A Boundary towards neighbor cells

|        | Main Lobe | Side Lobe | Low Confidence |
|--------|-----------|-----------|----------------|
| Cell 1 | 0.6       | 0.2       | 0.2            |
| Cell 2 | 0         | 0.8       | 0.2            |
| ...    | ...       | ...       | ...            |
| Cell N | 0.1       | 0.5       | 0.4            |

In Table 1 the entries may represent the fraction of wireless devices 12 being handed over from "Cell A" to "Cell 1", "Cell 2", . . . , "Cell N" which in "Cell A" are served by the main lobe, a side lobe, or a lobe with low confidence at the time of hand over. Alternatively, in Table 1 the entries may represent the fraction of the boundary region of "Cell A" to "Cell A" to "Cell 1", "Cell 2", . . . , "Cell N" that is served by the main lobe, a side lobe, or a lobe with low confidence at "Cell A".

There may be different ways for the network node 11a to interact and exchange information with another network node 11b. Different embodiments relating thereto will now be described in turn.

In some embodiments the cell specific beam categories in the boundary regions are used by the network node 11a to determine how the coverage region of its cell and the coverage region of a cell of a neighbor network node (i.e., a neighbor cell) overlap in the boundary regions in terms of the cell shaping beam's antenna diagram point of view. In addition to the categorization of the wireless device 12, by means of the acquired antenna beam information, when the wireless device 12 is about to be handed over to a specific neighbor cell, the neighbor cell could also categorize the wireless device after the handover.

For example, after completion of the handover process, the network node 11b of the neighbor cell will establish a WD specific beam towards the wireless device 12. Again, by the network node 11b performing the same procedure as the network node 11a disclosed above (such as at least steps S106 and S114 and optionally any of steps S102, S104, S108, S110, S114, S116, S118, S120), the neighbor cell will be able to determine its cell specific beam's coverage mapping towards the wireless device, thereby categorizing the wireless device 12.

The category information may be exchanged with the original serving cell of the wireless device 12 in order to obtain a mapping of coverage overlap type. Particularly, according to an embodiment the network node 11a is configured to, in a step S122, transmit information indicative of the cell specific beam category of the wireless device 12 to a neighbor network node 11b or another node, such as a central control node, in the communications network 10a, 10b, 10c. The information may be transmitted during a handover of the wireless device 12 to the neighbor network node 11b.

Further, the network node 11a having handed over the wireless device 12 may request the target network node 11b (i.e., the new serving network node 11b) in the new serving cell to perform categorization of the wireless device 12 after handover. Hence, according to an embodiment the network node 11a is configured to, in a step S124, request a neighbor network node 11b to which the wireless device 12 is to be handed over to, for the wireless device 12, perform acquiring of antenna beam information (as in step S106) and classifying of the acquired antenna beam information (as in S114) after handover of the wireless device 12 to the neighbor network node. The network node 11a may further request the neighbor network node 11b to report back the thereby determined cell specific beam category of the wireless device 12 to the network node 11a.

The exchange of information between network nodes 11a, 11b could be accompanied by using new Information Elements (IE) when transferring information between the network nodes 11a, 11b. Some of the possible embodiments are given below.

When the original serving network node 11a handovers the wireless device 12 to the neighbor network node 11b, the original serving network node 11a could include a 'lobe type' IE while transmitting a Handover Request message.

Once the neighbor network node 11b has completed the handover, the neighbor network node 11b could include the 'lobe type' IE (as determined by the neighbor network node 11b) while transmitting a Handover Complete message to the original serving network node 11a.

The 'lobe type' IEs could be exchanged as a proprietary IE in dedicated X2 signaling and/or via operations and management (OAM) signaling.

There may be different ways to determine of which wireless devices 12 such information is to be transmitted. For example, the cell specific beam categories may only be exchanged for wireless devices 12 in cell boundaries. Thus, according to an embodiment the transmitting in step S122 is only performed if a location of the wireless device 12 corresponds to a boundary of a region covered by the cell specific beam 15a, 15b. For example, the cell specific beam categories may only be exchanged for wireless devices 12 being handed over. According to a further embodiment the transmitting in step S122 is thus only is performed if the wireless device 12 is to be handed over between the network node 11a and the neighbor network node 11b.

The involved network nodes 11a, 11b could use this information to update their databases. One example of how the data can be stored for a given pair of network nodes (as exemplified by cells denoted "Cell-A", "Cell-B", and "Cell-C", based on the categories "Main Lobe", "Side Lobe", and "Low Confidence", is shown in Table 2. According to the illustrative example entries provided in Table 2, the probability that handover of a wireless device 12 occurs from the main lobe of "Cell-A" to the main lobe of "Cell-B" is 0.4, the probability that handover of a wireless device 12 occurs from a side lobe of "Cell-A" to the main lobe of "Cell-B" is 0.1, etc.

TABLE 2

Example table keeping track of categories of cell pairs.

|  |  | Cell-B | | | Cell-C | | |
|---|---|---|---|---|---|---|---|
|  |  | Main Lobe | Side Lobe | Low Confidence | Main Lobe | Side Lobe | Low Confidence |
| Cell-A | Main Lobe | 0.4 | 0 | 0.1 | 0 | 0 | 0 |
|  | Side Lobe | 0.1 | 0 | 0.1 | 0.1 | 0.8 | 0 |
|  | Low Confidence | 0.2 | 0.1 | 0 | 0 | 0 | 0.1 |

A data structure corresponding to this table could be used as a counter for the network node 11a, 11b to identify what type of coverage overlap exists between the given pair of network nodes.

There may be different actions to be performed based on in which category the acquired antenna beam information has been classified. Different embodiments relating thereto will now be described in turn.

In general terms, the information acquired in any of the above disclosed steps, combined or by themselves, is by the network node 11a processed to improve one or more applications or used as input to optimization algorithms, such as to perform a load balancing action of the wireless device 12 and/or a radiation beam pattern change related to the cell specific beam category (as in above disclosed step S126).

As noted above, not all wireless devices 12 need to be capable of receiving WD specific beams 16a, 16b in order to benefit from the information acquired from the wireless devices 12 that are capable of WD specific beam forming, as in step S106. Directional information from the WD specific beamforming capable wireless devices 12 can be used to determine the possible impact of antenna changes (as will be explained below in terms of use cases). Directional information as acquired in step S106 could be given a high weight factor in decision making of cell shaping when there is a combination of wireless devices 12 with and without the capability of WD specific beam forming.

Embodiments relating to different types of actions that may be performed in step S126 will now be disclosed in detail. The first type of action relates to load balancing with a neighbor network node 11b. That is, according to an embodiment the load balancing action of the wireless device 12 comprises performing load balancing with a neighbor network node 11b. The load balancing may either comprise using mobility load balancing or using radiation beam pattern changes. The second type of action relates to change of direction and/or width of a cell specific beam. That is, according to an embodiment the radiation beam pattern change comprises changing at least one of direction and width of the cell specific beam.

Assume that a network node 11a, as represented by a cell denoted "Cell-A" is identified to be overloaded and if antenna parameter changing is considered to be the way to carry out load balancing, then a network node 11b, as represented by a cell denoted "Cell-B" is selected that, firstly, provides its main lobe coverage towards the boundary locations of "Cell-A", and secondly, that has a lower load so that the load balancing can be successful. Basing the decisions of load balancing just on the load of the two or more cells might not guarantee any handover of the wireless devices 12 between the cells during the load balancing process. Using a neighbor "Cell-B" with main lobe coverage towards the border of "Cell-A" will ensure that the changes in antenna parameter of "Cell-B" will result in change in a geographical boundary towards "Cell-A".

By observing the example table given in Table 2, if the network node 11a "Cell-A" determines to offload its wireless devices 12 and assuming that both "Cell-B" and "Cell-C" are lowly loaded and thus suitable for load balancing with "Cell-A", then it is more advantageous to select "Cell-B" for joint load balancing as there is a higher probability (0.4 compared to 0) of changing the coverage boundary between "Cell-A" and "Cell-B" as they overlap more in their main lobes compared to the main lobe overlap between "Cell-A" and "Cell-C".

The network node 11a may further utilize information as in Table 2 to determine in which direction to tilt its antenna. For this purpose the network node 11a may determine the location of cell edge wireless devices 12 in the antenna diagram (e.g. if the cell edge wireless devices 12 are located on the left or the right of the main lobe of "Cell-A" and "Cell-B". Being located left of the main lobe indicates the uptilting angular spread region of the antenna and right of the main lobe indicates the downtilting angular spread region of the antenna. The exact amount of required changes could be dependent on how far the wireless devices 12 are from the maximum achievable antenna gain. An illustrative example is shown in Table 3.

TABLE 3

Example showing information regarding lobe type.

| Cell-A cell edge wireless devices left of main lobe of Cell-A | Cell-A cell edge wireless devices right of main lobe of Cell-A | Cell-A cell edge wireless devices left of main lobe of Cell-B | Cell-A cell edge wireless devices right of main lobe of Cell-B | Preferred action for Cell-A | Preferred action for Cell-B |
|---|---|---|---|---|---|
| 0.75 | 0.25 | 0.85 | 0.15 | Downtilt | Downtilt |
| 0.75 | 0.25 | 0.15 | 0.85 | Downtilt | Uptilt |
| . . . | . . . | . . . | . . . | . . . | . . . |

If a network node 11a (as represented by "Cell-A") is identified to be overloaded and a neighbor network node 11b (as represented by "Cell-C") is selected for load balancing, assuming that "Cell-C" is having a majorly side lobe coverage overlap with "Cell-A", "Cell-C" can potentially have minimal impact by antenna parameter changes towards the "Cell-A" coverage boundary. Therefore, minimum leakage beamforming (MLB) can be used rather than antenna parameter optimization to implement load balancing between "Cell-A" and "Cell-C".

In a one-dimensional search space of optimizing the antenna parameters in a single cell, it may be beneficial to classify wireless devices 12 as being located either as left of main lobe or as right of main lobe (of the vertical antenna diagram pattern; the same methodology holds true also for horizontal antenna diagram pattern). An illustrative example is shown in Table 4. A that similar table could be generated only for wireless devices 12 having a performance (throughput, signal to interference and noise ratio, etc.) below some or threshold) to impact cell edge wireless devices 12 more efficiently.

TABLE 4

Example of antenna search space reduction for a single cell.

| Wireless devices right of main lobe | Wireless devices left of main lobe | Preferred antenna change direction |
|---|---|---|
| 0.95 | 0.05 | Downtilt |
| 0.05 | 0.95 | Uptilt |
| ... | ... | ... |

Reference is now made to FIG. 6 illustrating a method for utilizing antenna beam information as performed by a network node 11a according to one particular embodiment based on at least some of the above disclosed embodiments.

S201: Network node 11a acquires information on WD specific beam direction usage/distribution. Network node 11a acquires information regarding the beamforming used for wireless devices 12 capable of WD specific beam forming in terms of the optimal direction of antenna main beam for the wireless devices 12. Network node 11a filters out information from wireless devices not capable of WD specific beam forming and/or weigh information from wireless devices capable of WD specific beam forming. One way to implement step S201 is to perform steps S106, S110, S112.

S202: Network node 11a maps the WD specific beam information to cell specific beam categories. Network node 11a maps the acquired antenna beam information to the cell specific beam and categorizes the region. One way to implement step S202 is to perform steps S114, S116.

S203: Network node 11a assigns cell specific beam categories to its cell boundaries to determine how the coverage area of the cell overlaps in the boundary region towards another cell. One way to implement step S203 is to perform steps S102, S104, S108, S118.

S204: Network node 11a exchanges cell specific beam categories in cell boundaries with neighbor network node 11b. Network node 11a exchanges information of any wireless device 12 that is being handed over to the neighbor network node 11b to determine the antenna diagram coverage type overlap of neighbor cells in the boundary region. One way to implement step S204 is to perform any of steps S122, S124 and S205: Network node 11a, based on the information acquired in step S202 (and optionally in any of steps S204 and S205) to perform a load balancing action and/or a radiation beam pattern change. One way to implement step S205 is to perform step S126.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for utilizing antenna beam information, the method comprising a network node:
   acquiring antenna beam information indicative of a direction of a wireless device (WD) specific beam of the network node;
   classifying the acquired antenna beam information into a cell-specific beam category based on an angular difference between the direction of the WD-specific beam and a direction of main lobe of a cell-specific beam of the network node; and
   performing at least one of a load balancing action of the WD and a radiation beam pattern change related to the cell-specific beam category.

2. The method of claim 1, wherein the WD-specific beam is used by a wireless device capable of WD-specific beam forming.

3. The method of claim 1, wherein the direction of the WD-specific beam is the direction of the main lobe of the WD-specific beam.

4. The method of claim 1, wherein the direction of the WD-specific beam is a time-wise mean direction of the direction of the main lobe of the WD-specific beam.

5. The method of claim 1, wherein the antenna beam information is further indicative of at least one of the following in relation to the WD-specific beam:
   azimuth direction and shape; and
   an elevation direction and shape of the WD-specific beam.

6. The method of claim 1:
   wherein the WD-specific beam has a width;
   further comprising weighting the antenna beam information with a first importance weight parameter, wherein the first importance weight parameter is inversely proportional to the width; and
   wherein the classifying is based on the weighted antenna beam information.

7. The method of claim 1:
   wherein the WD is associated with a speed of movement;
   further comprising weighting the antenna beam information with a second importance weight parameter, wherein the second importance weight parameter is inversely proportional to the speed; and
   wherein the classifying is based on the weighted antenna beam information.

8. The method of claim 1, wherein the cell-specific beam category is selected from a set of at least two cell-specific beam categories.

9. The method of claim 1, further comprising classifying the WD into a cell-specific beam category based on the angular difference.

10. The method of claim 1, further comprising:
    acquiring a location of the WD; and
    classifying the location of the WD into a cell-specific beam category based on the angular difference.

11. The method of claim 10, wherein the classifying is only performed if the location corresponds to a boundary of a region covered by the cell-specific beam.

12. The method of claim 1, further comprising:
    acquiring an indication that the WD is to be handed over to a neighbor network node; and in response acquiring the indication, performing the acquiring antenna beam information and the classifying the acquired antenna beam information.

13. The method of claim 10, further comprising storing a relation between the location of the WD and the cell-specific beam category of the location.

14. The method of claim 1, further comprising transmitting information indicative of the cell-specific beam category of the WD to a neighbor network node or another node.

15. The method of claim 14, wherein the information indicative of the cell-specific beam category of the WD is transmitted during a handover of the WD to the neighbor network node.

16. The method of claim 15, wherein the transmitting the information indicative of the cell-specific beam category of the WD is only performed if a location of the WD corresponds to a boundary of a region covered by the cell-specific beam.

17. The method of claim 15, wherein the transmitting the information indicative of the cell-specific beam category of the WD is only is performed if the WD is to be handed over between the network node and the neighbor network node.

18. The method of claim 1, further comprising requesting a neighbor network node to which the WD is to be handed over to, for the WD:
perform the acquiring antenna beam information and the classifying the acquired antenna beam information after handover of the WD to the neighbor network node; and
report back the thereby determined cell-specific beam category of the WD to the network node.

19. The method of claim 1, wherein the load balancing action of the WD comprises performing load balancing with a neighbor network node.

20. The method of claim 1, wherein the radiation beam pattern change comprises changing at least one of direction and width of the cell-specific beam.

21. A network node for utilizing antenna beam information, the network node comprising:
processing circuitry;
memory containing instructions executable by the processing circuitry whereby the network node is operative to:
acquire antenna beam information indicative of a direction of a wireless device (WD) specific beam of the network node;
classify the acquired antenna beam information into a cell-specific beam category based on an angular difference between the direction of the WD-specific beam and a direction of main lobe of a cell-specific beam of the network node; and
perform at least one of a load balancing action of the WD and a radiation beam pattern change related to the cell-specific beam category.

22. A non-transitory computer readable recording medium storing a computer program product for utilizing antenna beam information, the computer program product comprising software instructions which, when run on processing circuitry of a network node, causes the network node to:
acquire antenna beam information indicative of a direction of a wireless device (WD) specific beam of the network node;
classify the acquired antenna beam information into a cell-specific beam category based on an angular difference between the direction of the WD-specific beam and a direction of main lobe of a cell-specific beam of the network node; and
perform at least one of a load balancing action of the WD and a radiation beam pattern change related to the cell-specific beam category.

* * * * *

UNITED STATES PATENT AND TRADEMARK OFFICE
CERTIFICATE OF CORRECTION

| | | |
|---|---|---|
| PATENT NO. | : 10,141,998 B2 | Page 1 of 1 |
| APPLICATION NO. | : 15/543357 | |
| DATED | : November 27, 2018 | |
| INVENTOR(S) | : Ramachandra et al. | |

It is certified that error appears in the above-identified patent and that said Letters Patent is hereby corrected as shown below:

In the Specification

In Column 5, Line 38, delete "arranged to from" and insert -- arranged to form --, therefor.

In Column 8, Line 38, delete "the a cell" and insert -- the cell --, therefor.

In Column 8, Line 46, delete "FIG. 7," and insert -- FIG. 7. --, therefor.

In Column 11, Line 14, delete "only is performed" and insert -- only performed --, therefor.

In Column 11, Line 19, delete "nodes (as" and insert -- nodes as --, therefor.

In Column 12, Line 44, delete ""Cell-B"." and insert -- "Cell-B"). --, therefor.

In the Claims

In Column 15, Line 23, in Claim 17, delete "only is performed" and insert -- only performed --, therefor.

Signed and Sealed this
Ninth Day of April, 2019

Andrei Iancu
*Director of the United States Patent and Trademark Office*